[11] 3,548,808

[72] Inventors Nagashige Takahashi;
Satoru Sakamoto, Tokyo, Japan
[21] Appl. No. 777,340
[22] Filed Nov. 20, 1968
[45] Patented Dec. 22, 1970
[73] Assignee Olympus Optical Co., Ltd.
Tokyo, Japan
[32] Priority Nov. 22, 1967
[33] Japan
[31] Nos. 42/75029 and 42/75030

[54] DEVICE FOR SWITCHING THE DIRECTION OF THE OBSERVATION IN AN ENDOSCOPE
9 Claims, 11 Drawing Figs.
[52] U.S. Cl. .................................................. 128/6,
350/96, 350/286
[51] Int. Cl. ................................................... A61b 1/06,
A61b 1/30; G02b 5/04
[50] Field of Search ...................................... 128/6, 7, 8,
9, 397; 350/52, 96B, 267, 286

[56] References Cited
UNITED STATES PATENTS
| | | | |
|---|---|---|---|
| 2,699,770 | 1/1955 | Fourestier et al. | |
| 2,927,574 | 3/1960 | Scholz | 128/6 |
| 2,987,960 | 6/1961 | Sheldon | 128/6 |
| 3,096,756 | 7/1963 | Rosenfeld et al. | 128/6X |
| | | | 128/6 |

*Primary Examiner*—Richard A. Gaudet
*Assistant Examiner*—Channing L. Pace
*Attorney*—Kurt Kelman

ABSTRACT: Device for switching the direction of the observation of an object in an endoscope having a forward end portion provided therein with an image forming optical system and a control housing connected to the forward end portion through an elongated tube, an image transmitting optical system extending through the elongated tube with the forward end thereof terminating adjacent to the image forming optical system so that an image of the object is formed on the forward end of the image transmitting optical system by means of the image forming optical system, the thus formed image being transmitted through the image transmitting optical system to the rearward end thereof so as to be viewed through an ocular means provided in the control housing. A pair of light reflecting prisms are located in series in front of the image forming optical system in the optical axis thereof with one of the nonreflecting surfaces of each of the pair of reflecting prisms positioned substantially normal to the optical system and with the reflecting surfaces thereof positioned in opposing relationship substantially in parallel to each other with a thin clearance held therebetween and extending obliquely with respect to the optical axis.

The other of the nonreflecting surfaces of one of the pair of reflecting prisms located adjacent to the image forming optical system is positioned so as to face sidewards outwardly of the forward end portion so that the light incident to the above described other nonreflecting surface from the side of the forward end portion is normally reflected by the reflecting surface of the prism toward the image forming optical system thereby permitting the side observation to be carried out. When a transparent fluid such as water and alcohol is introduced into the thin clearance between the pair of reflecting prisms, the pair of prisms are optically integrally joined with each other by the medium of the fluid introduced into the thin clearance so that the light incident to the front nonreflecting surface of the pair of prisms from the front of the forward end portion of the endoscope straightly passes through the pair of prisms toward the image forming optical system thereby permitting the front observation to be carried out by the endoscope.

Alternatively, the inclination of the reflecting surfaces of the pair of prisms forming therebetween the thin clearance is so set that the light incident to the front prism normally passes through the pair of prisms toward the image forming optical system for the front observation, and a light reflecting fluid such as mercury is introduced into the thin clearance so as to reflect the light incident to the sidewards facing nonreflecting surface of the rear prism toward the image forming optical system for effecting the side observation while the light from the front of the forward end portion is prevented from entering the rear prism by virtue of the fluid introduced into the thin clearance.

PATENTED DEC 22 1970

INVENTOR
Nagashige Takahashi, Satoru Sakaunde
BY
Kurt Kelman
Agent 3,548,808

INVENTORS
Nagashige Takahashi, Satoru Sakamoto
BY Kurt Kelman
Agent

DEVICE FOR SWITCHING THE DIRECTION OF THE OBSERVATION IN AN ENDOSCOPE

BACKGROUND OF THE INVENTION

The present invention relates to a device for switching the direction of the observation of an object in an endoscope having a forward end portion provided therein with an image forming optical system and a control housing connected to the forward end portion through an elongated tube having therein an image transmitting optical system extending therethrough so as to transmit the image formed by the image forming optical system on the forward end of the image transmitting optical system therethrough to the rearward end thereof so that the thus transmitted image is viewed through an ocular means provided in the control housing.

Various devices have been proposed to change the direction of the observation of an object incorporated in an endoscope. Among those, there is, for example, a device in which the forward end portion is bent relative to the front end of the elongated tube connected thereto by the operation of the remote control means incorporated in the control housing.

However, such a device requires complicated mechanical structures incorporated in the forward end portion thereby resulting in the enlargement in size of the forward end portion so that it cannot be used in an endoscope for the inspection of the gullet and the bronchi of a living body in which the diameter of the forward end portion is required to be reduced to the minimum, such as, for example, in the order of 5mm.

The present invention aims at avoiding the above disadvantages and providing a novel and useful device for switching the direction of the observation of an object in an endoscope of the type described above in which the direction of the observation of the object is switched without requiring any mechanical structures incorporated in the forward end portion of the endoscope.

SUMMARY OF THE INVENTION

An object of the present invention is to provide a novel and useful device for switching the direction of the observation of an object in an endoscope without requiring any mechanical construction incorporated in the forward end portion of the endoscope.

Another object of the present invention is to provide a novel and useful device for switching the direction of the observation of an object in an endoscope of the type described above in which the image in the side observation is inverted and reversed in the direction of the left and rightward directions so as to obtain the orthoscopic image of the object.

Further object of the present invention is to provide a novel and useful device for switching the direction of the illuminating light operable in relation to the operation of the device for switching the direction of the observation in the endoscope.

Other objects and the advantages of the present invention will be apparent from the description set forth below in connection with the accompanying drawings illustrating the preferred embodiments constructed in accordance with the present invention.

The above object is achieved in accordance with the present invention by providing a pair of light reflecting prisms in series in the forward end portion in front of the image forming optical system in the optical axis thereof with the reflecting surfaces thereof positioned in opposing relationship substantially in parallel to each other so as to form a thin clearance therebetween and extending obliquely with respect to the optical axis of the image forming optical system. One of the nonreflecting surfaces of each of the pair of reflecting prisms is located substantially normal to the optical axis while the other of the nonreflecting surfaces of one of the pair of prisms located adjacent to the image forming optical system faces sidewards outwardly of the forward end portion. Thus, the light incident from the side of the forward end portion to the sidewards facing nonreflecting surface of the prism located adjacent to the image forming optical system is normally reflected by the reflecting surface of that prism toward the image forming optical system so as to achieve the side observation by the endoscope. The thin clearance is adapted to be filled with a transparent fluid such as water and alcohol having a refracting index about the same as that of the material constructing the prisms and, when the fluid is introduced into the thin clearance, the pair of reflecting prisms are optically integrally joined so that the light incident to the front nonreflecting surface of the prism located remote from the image forming optical system from the front of the forward end portion of the endoscope passes through the thin clearance filled with the fluid as well as the prism located adjacent to the image forming optical system toward the same thereby permitting the front observation to be achieved. Therefore, by introducing the fluid into the thin clearance, the direction of the observation can be switched from that for the side observation to that for the front observation.

In accordance with a feature of the present invention, the prism located adjacent to the image forming optical system is made in the form of a roof-shaped prism such as an Amici prism having its reflecting surface in the form of a 90° roof, and the reflecting surface of the prism remote from the image forming optical system is made complementary with the 90° roof reflecting surface of the prism so that the cross section of the thin clearance is made in the form of V-shape.

Thus, the image obtained in the side observation through the roof-shaped prism is inverted and reversed in the direction of the left and rightward directions thereby permitting the orthoscopic image to be obtained.

Alternatively, the angle of inclination of the opposing reflecting surfaces of the pair of prisms is so set that the angle of incident of the light received by the front nonreflecting surface of the front prism remote from the image forming optical system is smaller that the critical angle of that prism so that the light incident to the front nonreflecting surface of the front prism usually passes through the thin clearance and the rear prism adjacent to the image forming optical system toward the same so as to achieve the front observation, whereas, when a light reflecting fluid such as mercury is introduced into the thin clearance between the pair of prisms, the light coming from the side of the forward end portion and incident to the sidewards obliquely rearwardly facing nonreflecting surface of the rear prism adjacent to the image forming optical system is reflected by the fluid in the thin clearance toward the image forming optical system while the light coming from the front of the forward end portion is prevented from entering the rear prism by the medium of the light reflecting fluid introduced into the thin clearance thereby permitting the obliquely rearwards side observation to be achieved.

In accordance with another feature of the present invention, an illuminating light conducting optical system is provided extending through the elongated tube with the forward end thereof terminating at the forward end portion, and a pair of reflecting prisms similar in construction and arrangement to those located in front of the image forming optical system are located in front of the forward end of the illuminating light conducting optical system so that the direction of the illuminating light emitted from the forward end of the illuminating light conducting optical system is switched selectively for either of the side or front illumination in relation to the side or front observation by introducing or expelling the fluid into or out of the thin clearance as in the case of switching the direction of the observation of the object.

DETAILED DESCRIPTION OF THE PREFERRED EMBODIMENTS

Figure 1:
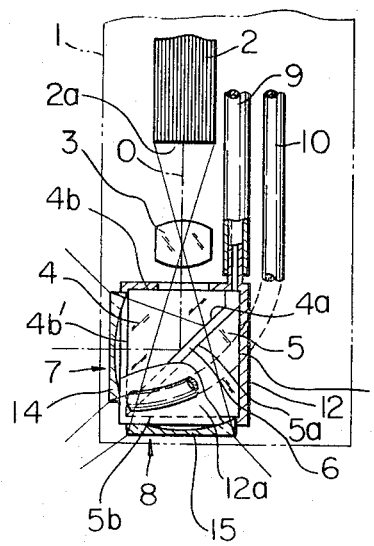
FIG. 1 is a fragmentary cross section showing the forward end portion of an endoscope incorporating therein the device for switching the direction of the observation of an object constructed in accordance with the present invention.
Figure 2:
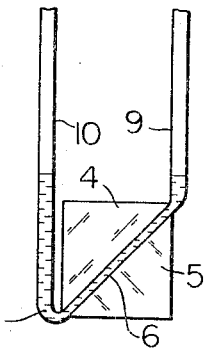
FIG. 2 is a schematic view showing the principle of the device of the present invention.
Figure 3:
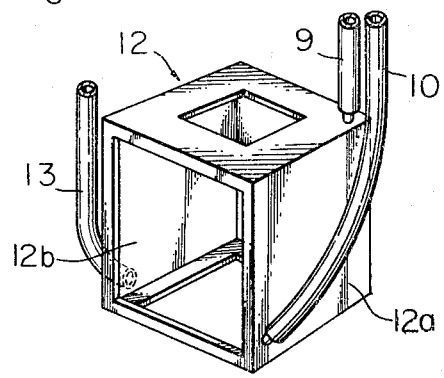
FIG. 3 is a fragmentary perspective view showing the casing holding the pair of prisms of the device of the present invention in position together with pipe means connected thereto for introducing or repelling the fluid into or out of the casing.

In FIG. 1, the forward end portion 1 is connected to an elongated tube (not shown). An image transmitting optical system 2 such as a fiber optical system extends through the elongated tube with the forward end surface 2a being located in spaced relationship from an image forming optical system 3, i.e. an objective lens, in alignment therewith, so that the light from an object incident to the image forming optical system 3 is focused on the forward end surface 2a to form an image of the object thereon which is transmitted through the image transmitting optical system 2 to the rearward end thereof so as to be viewed through an ocular means (not shown) provided in a control housing (also not shown) connected to the rearward end of the elongated tube and in which the rearward end of the image transmitting optical system 2 terminates in spaced relationship to the ocular means in alignment therewith. In accordance with the present invention, a pair of light reflecting prisms 4 and 5 are arranged in series in front of the image forming optical system 3 in the optical axis 0 thereof with the reflecting surfaces 4a, 5a of the pair of prisms 4, 5 extending obliquely with respect to the optical axis 0 and spaced a slight distance in substantially parallel relationship to each other so as to form therebetween a thin clearance 6. One of the nonreflecting surfaces 4b, 5b each of the pair of prisms 4, 5 are positioned substantially normal to the optical axis 0 while the other of the nonreflecting surfaces 4b', 5b' each of the pair of prisms 4, 5 face sidewards of the front end portion 1. An opening or window 7 is provided in the side wall of the front end portion 1 in alignment with the sidewards facing nonreflecting surface 4b' of the prism 4, while an opening or window 8 is provided in the end surface of the forward end portion 1 in alignment with the nonreflecting surfaces 5b of the prism 5.

In accordance with the characteristic feature of the present invention, transparent fluid 11 such as water and alcohol having a refracting index about the same as that of the material forming the prisms 4, 5 is introduced in the thin clearance 6 by means of pipe means 9 and discharged therefrom by means of another pipe means 10 or vice versa, both the pipe means 9, 10 extending through the elongated tube so that the fluid is supplied or discharged therethrough from the rearward ends thereof adjacent to the control housing. In order to hold the prisms 4, 5 in position, a casing 12 provided with side walls 12a, 12b —is provided as shown in which the prisms 4,5 are secured so as to keep the thin clearance 6 fluid tight and to which the piping means 9,10 are connected.

Normally, the thin clearance 6 is filled with air thereby optically separating the pair of prisms 4,5 from each other so that the light incident to the nonreflecting surface 4b' of the prism 4 through the opening 7 is reflected by the reflecting surface 4a thereof toward the image forming optical system 3 for the side observation by the endoscope while the light incident to the nonreflecting surface 5b of the prism 5 through the opening 8 is totally reflected away from the optical axis 0 by the reflecting surface 5a of the prism 5.

However, when the fluid 11 is introduced into the thin clearance 6 through pipe means 9, both the prisms 4,5 are optically integrally joined with each other so that the light incident to the nonreflecting surface 5b of the prism 5 passes through the thin clearance 6 and the prism 4 toward the image forming optical system 3 by virtue of the existence of the fluid 11 in the thin clearance 6 for the front observation by the endoscope, while the light incident to the sidewards facing nonreflecting surface 4b' of the prism 4 passes through the thin clearance 6 and is prevented from entering the prism 4.

In order to switch the direction of the observation from the front observation to the side observation, air is forced into the thin clearance 6 through either of the pipe means 9, 10 so as to expel the fluid 11 from the thin clearance 6. Further pipe means 13 similar to the pipe means 9, 10 may be provided for forcibly ejecting air into the thin clearance 6 so as to assist in expelling the fluid 11 from the thin clearance 6.

Light diverging optical systems 7, 8 may be provided in front of the nonreflecting surfaces 4b', 5b of the prisms 4, 5, respectively, so as to widen the field of view obtained by the endoscope.

FIGS. 4 to 9 show another embodiment of the present invention in which illuminating light conducting optical systems such as fiber optical systems are provided the direction of the illumination of which can be switched in relation to the switching of the direction of the observation by the endoscope described above.

Figure 4:
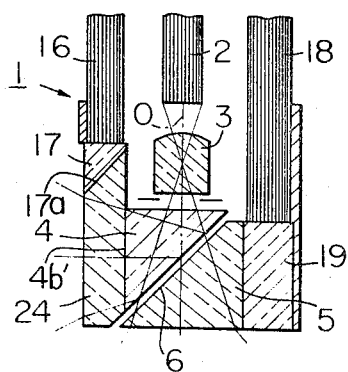
FIG. 4 is a fragmentary cross-sectional view similar to FIG. 1 but showing the illuminating light conducting optical system incorporated in the device of the present invention.
Figure 5:
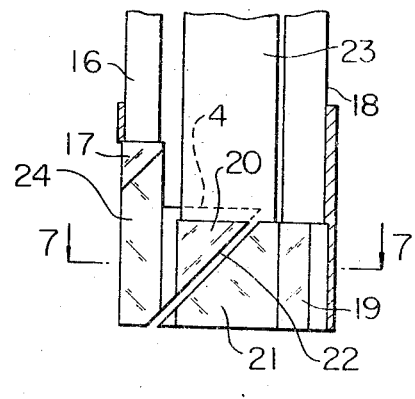
FIG. 5 is a side view of FIG. 4.
Figure 6:
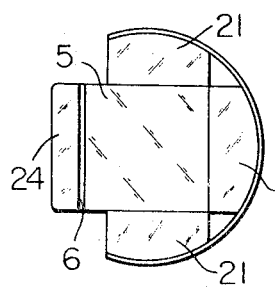
FIG. 6 is an end view showing the end surface of FIG. 4.
Figure 7:
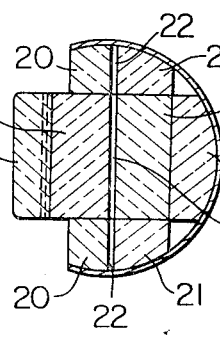
FIG. 7 is a cross-sectional view taken along line 7–7 in FIG. 5.
Figure 8:
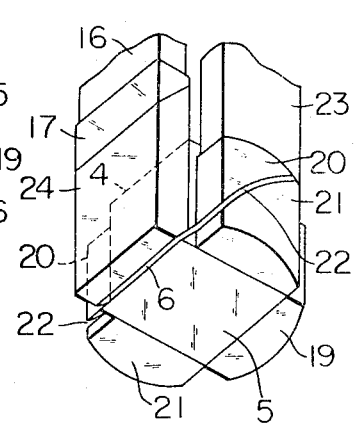
FIG. 8 is a fragmentary perspective view showing the forward end of the endoscope of the present invention shown in FIG. 5.
Figure 9:
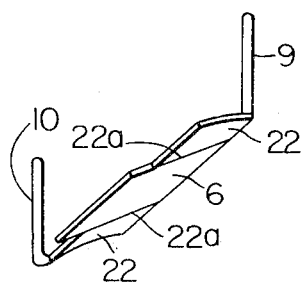
FIG. 9 is a perspective view showing the thin clearance formed between the pair of prisms shown in FIG. 4 with piping means shown as being connected to the thin clearance.

In FIG. 4, a light conducting optical system 16 extends through the elongated tube and terminates at a position adjacent to the image forming optical system 3. A light reflecting prism 17 is attached to the forward end of the light conducting optical system 16 so as to reflect the light emitted therefrom toward the side of the forward end portion of the endoscope thereby permitting the object as viewed in the side observation by the endoscope to be illuminated. Another light conducting optical system 18 also extends through the elongated tube and terminates at a position adjacent to the image forming optical system 3. A light transmitting optical element 19 is attached to the forward end of the light conducting optical system 18 so that the light emitted from the light conducting optical system 18 is transmitted therethrough toward the front of the forward end portion of the endoscope thereby permitting the object viewed in the front observation by the endoscope to be illuminated.

Therefore, the object located not only at the side of the forward end portion but also in front of the forward end portion can be illuminated by selectively conducting the illuminating light through either one of the light conducting optical systems 16, 18.

A glass plate 24 is provided in front of the nonreflecting surface 4b' of the prism 4 and a partition 17a is provided between the prism 17 and the glass plate 24 so as to prevent the optical interference therebetween.

In accordance with further feature of the present invention, a pair of prisms 20, 21 similar in construction and arrangement to the pair of prisms 4,5 located in front of the image forming optical system 3 are located in front of the forward end of each of the pair of light conducting optical systems 23 extending through the elongated tube in diametrically opposite sides therein with a thin clearance 22 held between the pair of prisms 20, 21 in like manner as in the case of the prisms 4,5. Thus, by introducing the fluid 11 into the thin clearances 22 as well as the thin clearance 6 through pipe means 9, the direction of the illumination is switched from the side illumination to the front illumination at the same time the direction of the observation by the endoscope is switched from the side observation to the front observation, while the light emitted from the light conducting optical system 23 is normally reflected by the prism 20 for the side illumination when the fluid 11 is not introduced into the thin clearance 22. Partition 22a having at least a through hole is provided so as to separate the thin clearance 22 from the thin clearance 6 in order to prevent the optical interference between the thin clearances 6, 22.

In accordance with still further feature of the present invention, a light reflecting liquid such as mercury is used in place of the transparent liquid 11 of FIGS. 1 and 4 so as to reflect the light coming from the side of the forward end portion toward the image forming optical system for the side observation when the light reflecting fluid is filled in the thin clearance between the pair of prisms while, when the fluid is not existing in the thin clearance, the light coming from the front of the forward end portion passes through the thin clearance as well as the pair of prisms so that the front observation is achieved.

Figure 10:
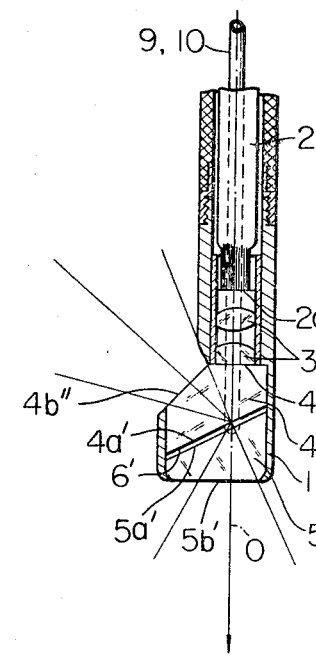
FIG. 10 is a fragmentary cross section similar to FIG. 1 but showing a modification of the present invention.

To this end, as shown in FIG. 10, the angle of inclination of the reflecting surfaces 4a', 5a' of the pair of prisms 4', 5' with respect to the plane normal to the optical axis 0 is so set that the angle of incidence of the light coming from the front of the forward end portion 1 toward the reflecting surfaces 4a', 5a—' is smaller than the critical angle of the prism 5' as determined by the material forming the same and the angle of inclination of the sidewards facing nonreflecting surface 4b'' of the prism 4' with respect to the plane normal to the optical axis 0 is about the twice as that of the reflecting surfaces 4a', 5a' of the prisms 4', 5'. Thus, the light incident to the front nonreflecting surface 5b' of the prism 5' passes through the thin clearance 6' and the prism 4' toward the image forming optical system 3 for the front observation when the light reflecting fluid is not existing in the thin clearance 6', while the light incident to the nonreflecting surface 4b'' of the prism 4' is not reflected by the reflecting surfaces 4a', 5a' but passes therethrough and is prevented from entering the image forming optical system 3, whereas, when the light reflecting fluid is introduced into the thin clearance 6', the light incident to the nonreflecting surface 4b'' of the prism 4' is reflected by the light reflecting fluid in the thin clearance 6' toward the image forming optical system 3 thereby permitting the obliquely rearward side observation to be achieved while the light incident to the front nonreflecting surface 5b' of the prism 5' is prevented from entering the prism 4' by the medium of the light reflecting fluid in the thin clearance 6'.

The embodiment of FIG. 10 is extremely useful in the inspection of the hollow portion in a living body such as cardia and gall bladder pipe opening at the wall of duodenum wherein the front observation is required for inserting the forward end portion into the hollow portion while the obliquely rearwards side observation is required for the inspection of the desired portion therein.

It is preferred to locate a diaphragm adjacent to the thin clearance 6' where the optical axis 0 intersects the same and to use an objective lens system 3 having its front principal plane intersecting the diaphragm so as to achieve the better optical performance.

Figure 11:
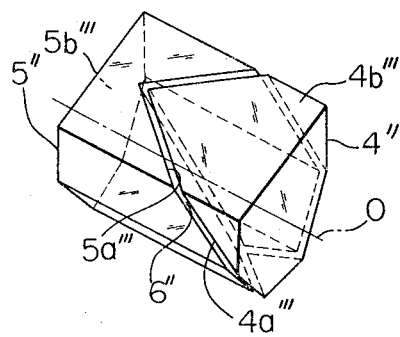
FIG. 11 is a fragmentary perspective view showing further embodiment of the present invention.

In accordance with still further feature of the present invention, the image in the side observation by the endoscope is inverted and reversed in the left and rightward direction so that the orthoscopic image is obtained in the side observation by utilizing a roof-shaped prism 4'' such as an Amici prism having its light reflecting surface 4a''' in the form of a 90° roof together with a mating prism 5'' having its light reflecting surface 5a''' complementary with the above described 90° roof as shown in FIG. 11, so that a 90° V-shaped thin clearance 6'' is provided between the opposing reflecting surfaces 4a''', 5a''' of the mating prisms 4'', 5''.

It is apparent that the image formed by the light incident to the nonreflecting surface 4b''' of the prism 4'' is inverted and reversed in the left and rightward directions by virtue of the 90° roof of the prism 4'' so as to obtain the orthoscopic image in the side observation when the transparent fluid is not existing in the V-shaped thin clearance 6'' while the light incident to the front nonreflecting surface 5b''' passes through the thin clearance 6'' and the prism 4'' for the front observation by the endoscope when the transparent fluid is introduced into the thin endoscope when the transparent fluid is introduced into the thin clearance 6''.

We claim:

1. Device for switching the direction of the observation of an object in an endoscope comprised of a forward end portion having therein an image forming optical system, a control housing having an ocular means therein and connected to said forward end portion through an elongated tube, an image transmitting optical system extending through said elongated tube with its forward end located adjacent to said image forming optical system in optical alignment therewith while the rearward end thereof is located adjacent to said ocular means in optical alignment therewith so that the image of an object is formed by means of said image forming optical system on the forward end of said image transmitting optical system and transmitted therethrough to the rearward end thereof so as to be viewed through said ocular means, wherein the improvement comprises a pair of light reflecting prisms arranged in series in front of said image forming optical system in alignment with the optical axis thereof within said forward end portion with one of the nonreflecting surfaces of each of said pair of reflecting prisms positioned substantially normal to said optical axis and with the light reflecting surfaces thereof positioned close to each other with a thin clearance formed therebetween extending obliquely with respect to said optical axis, while the other of said nonreflecting surface of one of said pair of reflecting prisms adjacent to said image forming optical system is positioned so as to face sidewards of said forward end portion so that the light coming from the side of said forward end portion is received thereby and reflected by said obliquely positioned light reflecting surface toward said one of said nonreflecting surface of said one of said pair of reflecting prisms a fluid having an optical behavior capable of charging the optical path of light incident thereto, and means for introducing said fluid into said thin clearance, thereby permitting the optical path from the exterior of said forward end portion toward said image forming optical system through said one of said reflecting prisms to be selectively switched between those for the front observation and for the side observation depending upon whether or not said fluid is filled in said thin clearance between said opposing light reflecting surfaces of said pair of reflecting prisms.

2. Device according to claim 1, wherein said fluid is a transparent liquid such as water and alcohol and the like having a refracting index about the same as that of the material forming said pair of reflecting prisms and the angle of inclination of said light reflecting surfaces is so selected that the incident angle of the light coming from the outside of the forward end onto said light reflecting surfaces is greater than the critical angle determined by the material forming said pair of prisms so that, when said transparent liquid is filled in said thin clearance, said pair of reflecting prisms are optically integrally joined with each other thereby passing therethrough toward said image forming optical system the light incident to the forward end nonreflecting surface of the other of said pair of reflecting prisms remote from said image forming optical system so that the front observation by the endoscope is carried out, while, when said transparent liquid is withdrawn from said thin clearance and a gas such as air is filled therein in place of said transparent liquid, said pair of reflecting prisms are optically isolated from each other thereby permitting the side observation by the endoscope to be carried out by virtue of the reflection of the light coming from said other sidewards facing nonreflecting surface of said one of said pair of reflecting prisms adjacent to said image forming optical system toward said one nonreflecting surface thereof by means of said light reflecting surface of the same.

3. Device according to claim 2, wherein said transparent liquid or said gas is selectively supplied to said thin clearance through pipe means extending through said elongated tube and discharged therefrom through further pipe means also extending through said elongated tube.

4. Device according to claim 1, wherein said fluid to be introduced into said thin clearance is a light reflecting liquid such as mercury and the like, and the angle of inclination of said light reflecting surfaces of said pair of reflecting prisms with respect to the plane normal to the optical axis is so selected that the angle of incidence of the light thereto coming through the forward end nonreflecting surface of said other of said pair of reflecting prisms remote from said image forming optical system is smaller than the critical angle thereof thereby permitting the above mentioned incident light to be transmitted through said thin clearance as well as said one of said pair of prisms adjacent to said image forming optical system toward the same for the front observation by the endoscope when said thin clearance is filled with said gas, whereas, when said light reflecting liquid is introduced into said thin clearance, the light coming from the other of said pair of reflecting prisms is prevented from passing through said thin clearance by virtue of said light reflecting liquid introduced into said thin clearance while the light coming obliquely from the rear to the side of said forward end portion through the rearwardly sidewards facing nonreflecting surface of said one of said pair of prisms adjacent to said image forming optical system is reflected by the light reflecting liquid in said thin clearance toward said image forming optical system thereby permitting the obliquely rearward side observation by the endoscope to be carried out.

5. Device according to claim 1, wherein a light diverging optical system such as a concave lens is mounted on the forward end nonreflecting surface of said other of said pair of reflecting prisms remote from said image forming optical system as well as on the sidewards facing nonreflecting surface of said one of said pair of reflecting prisms adjacent to said image forming optical system thereby permitting the field of view of either of the front and side observations by the endoscope to be enlarged.

6. Device according to claim 1, wherein two illuminating light conducting optical systems such as fiber optical systems are provided which extend through said elongated tube with their outer ends terminating at positions adjacent to said forward end portion, a reflecting prism being provided at the forward end of one of said illuminating light conducting optical systems so as to direct the illuminating light transmitted therethrough to said reflecting prism outwardly toward the side of said forward end portion for the side illumination while a light transmitting optical element is provided at the forward end of the other of said illuminating light conducting optical systems so as to direct the illuminating light transmitted therethrough to said optical element forwardly for the front illumination, thereby permitting the side or front illumination to be selectively effected by selectively conducting the light through either one of said two illuminating light conducting optical systems.

7. Device according to claim 1, wherein at least one illuminating light conducting optical system such as a fiber optical system is provided which extends through said elongated tube with its forward end terminating in said forward end portion, a pair of reflecting prisms being arranged in series in front of the forward end of said illuminating light conducting optical system in such a manner that one of the two nonreflecting surfaces of each of said pair of reflecting prisms is positioned substantially normal to the optical axis of said illuminating light conducting optical system and the light reflecting surfaces of said pair of reflecting prisms are located in slightly spaced relationship from each other obliquely with respect to said optical axis in the direction substantially parallel to those of the reflecting surfaces of said pair of reflecting prisms located in front of said image forming optical system so as to form a thin clearance therebetween, with the other of the nonreflecting surfaces of one of said reflecting prisms located adjacent to the forward end of said illuminating light conducting optical system facing sidewards of said forward end portion in the direction substantially parallel to that of said sidewards facing nonreflecting surface of said one of the pair of reflecting prisms located adjacent to said image forming optical system, fluid being introduced into said thin clearance at the same time the fluid is introduced into said thin clearance of said pair of reflecting prisms in front of said image forming optical system thereby permitting the direction of the illuminating light transmitted through said illuminating light conducting optical system to be switched between the side illumination and the front illumination in the same sense as the switching of the side observation and the front observation by the endoscope.

8. Device according to claim 2, wherein said one of said pair of reflecting prisms is a roof-formed prism such as an Amici prism with its reflecting surface shaped in the form of a 90° roof while the reflecting surface of said other pair of reflecting prisms is substantially complementarily shaped with said 90° roof-shaped reflecting surface of said one of pair of reflecting prisms so that a thin clearance having a 90° V-shape in cross section is formed therebetween thereby permitting the image formed by said image forming optical system to be inverted and reversed in the left and rightward direction so as to obtain a correct image.

9. Device according to claim 1, wherein pipe means is provided which extends through said elongated tube and communicates at its forward end with said thin clearance between the opposing reflecting surfaces of said pair of reflecting prisms, air being forcibly introduced into said thin clearance through said pipe means when said fluid is withdrawn from said thin clearance thereby permitting said fluid to be positively removed from said reflecting surfaces of said pair of reflecting prisms.